May 26, 1953  J. D. SPALDING  2,639,630
POWER PLANT FOR RIG DRIVE
Filed Oct. 6, 1950  2 Sheets-Sheet 1

JOHN D. SPALDING,
INVENTOR.

BY Lyon & Lyon
ATTORNEYS

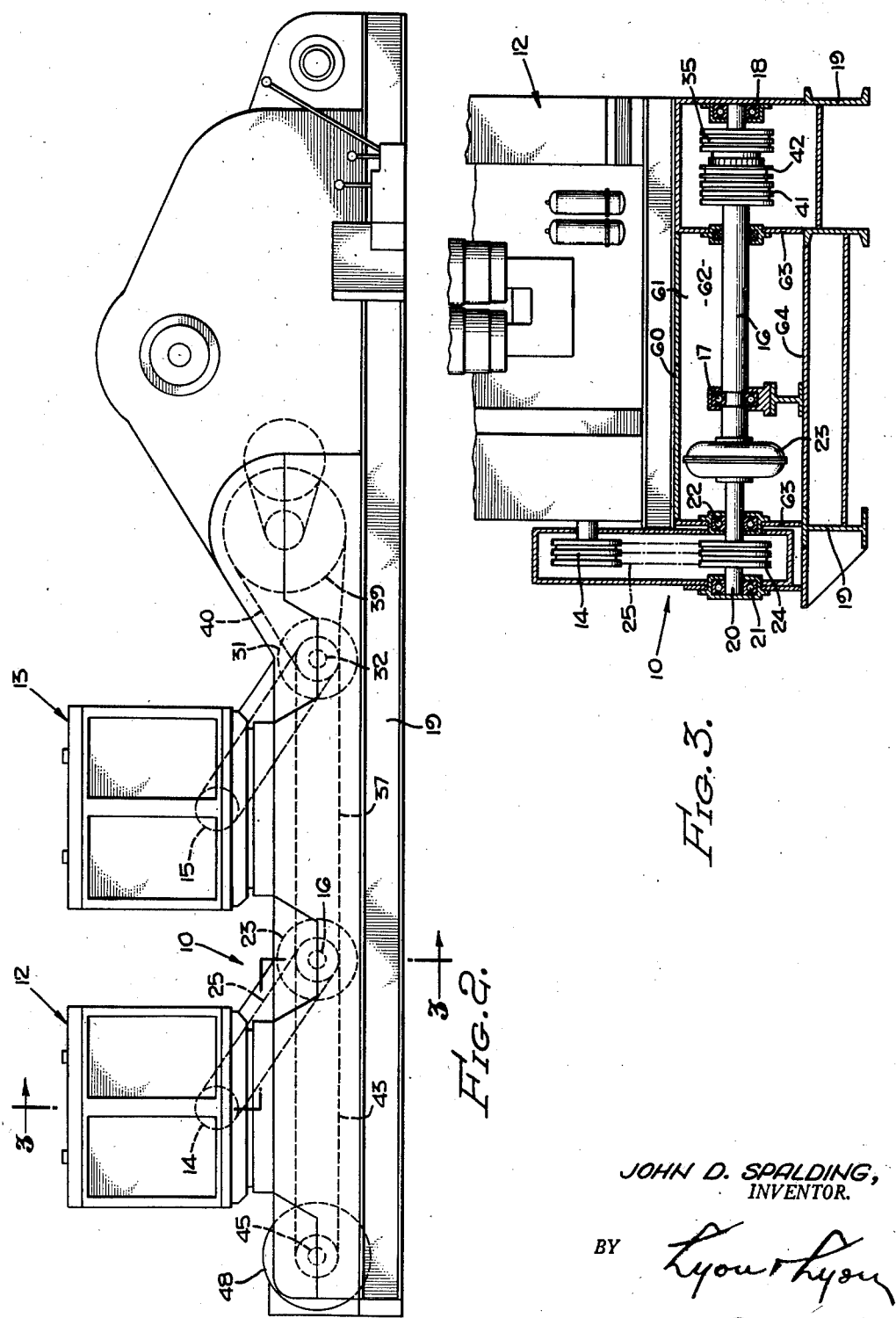

Patented May 26, 1953

2,639,630

UNITED STATES PATENT OFFICE 2,639,630

POWER PLANT FOR RIG DRIVE

John D. Spalding, Los Angeles, Calif., assignor to The National Supply Company, Pittsburgh, Pa., a corporation of Pennsylvania Application October 6, 1950, Serial No. 188,787

15 Claims. (Cl. 74—722)

This invention relates to well drilling apparatus and is particularly directed to improvements in a power plant for a well drilling rig.

An important object of this invention is to provide a novel form of power plant of minimum width employing a plurality of engine units in side-by-side relationship.

Another object of this invention is to provide a power plant of minimum width for highway transportation employing a plurality of engine units connected through power transmission connections located below the level of the engine units.

Another object is to provide a power plant of this type having engines in side-by-side relationship and employing power compounding shafts between the engine units and below the level thereof.

Another object is to provide a power plant of minimum width having a plurality of engine units positioned in side-by-side relationship, together with endless flexible power compounding connections extending transversely of the engine units remote from the power take-off end of the engine units.

Another object is to provide a power plant of this type which may employ hydraulic couplings of the kinetic type without increasing the over-all width of the power plant.

Other and more detailed objects and advantages will appear hereinafter.

In the drawings:

Figure 2 is a side elevation thereof.

Figure 3 is a sectional end elevation taken substantially on the line 3—3 as shown in Figure 2.

Figure 1:
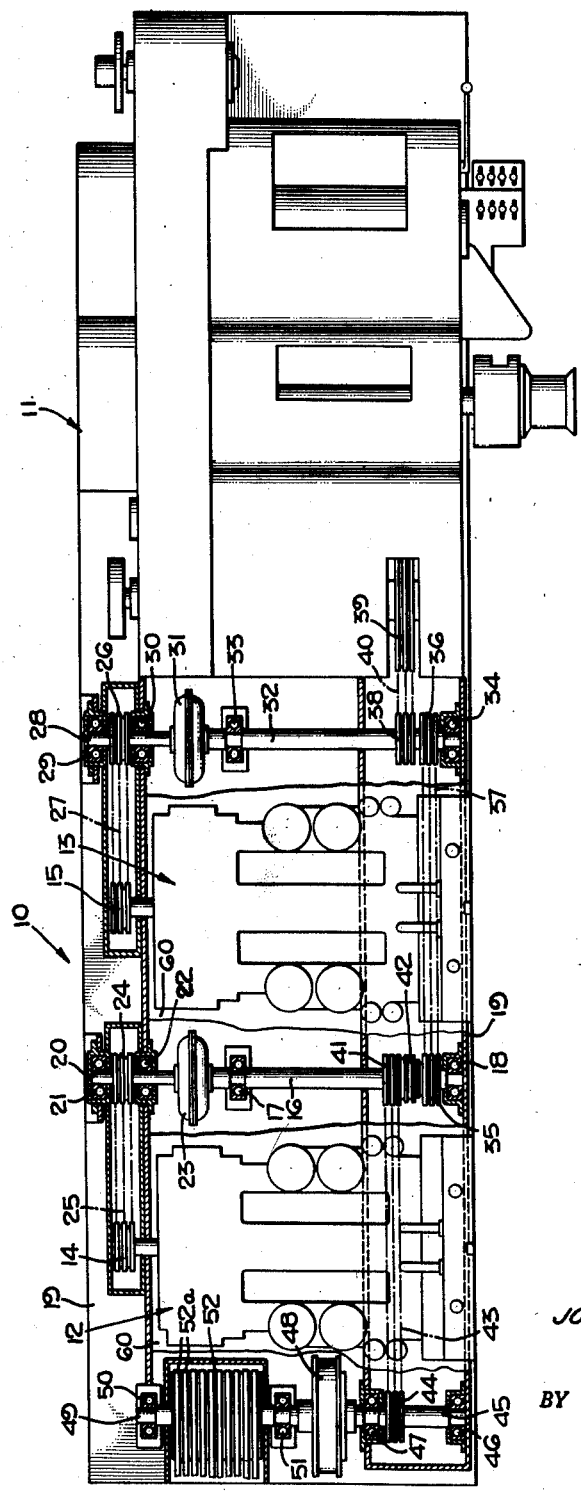
Figure 1 is a plan view showing a preferred form of power plant embodying my invention connected for driving a well drilling drawworks.

Referring to the drawings, the power plant 10 is employed for driving a well drilling drawworks 11 which may be of any convenient design and is preferably of the type shown in the copending application of John B. Picard for Drawworks, bearing Serial No. 97,055, filed June 3, 1949.

The power plant 10 includes a pair of engine units 12 and 13 which may be duplicates. Each of these engine units may comprise a single internal combustion engine or a group of such engines arranged to drive a common power take-off member. Thus the engine unit 12 drives a power take-off sprocket 14 and the engine unit 13 drives a similar power take-off sprocket 15.

A power compounding shaft 16 is rotatably supported in spaced bearings 17 and 18 carried on the same frame 19 which supports the engine units 12 and 13. As shown clearly in Figures 2 and 3, the power compounding shaft 16 is positioned at a lower elevation than the engine units 12 and 13. A stubshaft 20 is axially aligned with the power compounding shaft 16 and supported in spaced bearings 21 and 22, also carried on the frame 19. A connecting device 23 connects the opposed ends of the aligned shafts 16 and 20. This device 23 may take the form of a hydraulic coupling of the Föttinger type, as shown in the drawings, or if desired this device 23 may constitute an hydraulic torque converter, a magnetic clutch, or a friction clutch. If an hydraulic coupling is used, I prefer to employ one of the scoop tube type so that disengagement of the driving connection between the shafts 16 and 20 may be readily accompanied by partially or fully removing the hydraulic fluid from the working circuit of the device.

The stubshaft 20 has a driven sprocket 24 fixed thereon and positioned between the axially spaced bearings 21 and 22. An endless flexible chain 25 connects the power take-off sprocket 14 with the driven sprocket 24. From this description it will be understood that rotation of the power take-off sprocket 14 serves to drive the power compounding shaft 16 via the chain 25, sprocket 24 and connection device 23.

In similar fashion the power take-off sprocket 15 on the engine unit 13 drives sprocket 26 by means of chain 27. The sprocket 26 is fixed on stubshaft 28 which is carried on spaced bearings 29 and 30. A coupling device 31 which may take any of the forms described above in connection with coupling device 23 serves to connect the stubshaft 28 with the power compounding shaft 32. The latter shaft is mounted in axially spaced bearings 33 and 34 carried by frame 19.

A sprocket 35 is rotatably mounted on power compounding shaft 16 and a sprocket 36 is fixed on power compounding shaft 32. A chain 37 connects sprockets 35 and 36. A power take-off sprocket 38 is fixed on the shaft 32 and drives a drawworks sprocket 39 by means of chain 40. A spline clutch 42 is provided for connecting the sprocket 35 in direct driving relation with the shaft 16. A sprocket 41 is fixed to the shaft 16.

A chain 43 connects the sprocket 41 with the sprocket 44 which is fixed on the countershaft 45. The countershaft 45 is supported in axially spaced bearings 46 and 47 mounted on the frame 19. A friction clutch 48 connects the shaft 45 with the axially aligned pulley shaft 49. The latter shaft is mounted in spaced bearings 50 and 51. A grooved pulley 52 may be fixed on the pulley shaft 49 between the bearings 50 and 51 for driving a driven mechanism such as, for example, a slush pump, by means of V-belts 52a.

It will be observed that the chains 37 and 43 extend transversely of the engine units 12 and 13, and that these chains are located remotely from the position of the power take-off sprockets 14 and 15. These chains pass under the engine units instead of being positioned at the end thereof, so that over-all width of the power plant may be reduced. It is highly desirable to maintain the over-all width of the power plant within the eight-foot limit allowed for highway transportation without special permit. As wells are drilled into deeper and deeper strata the power requirements of the drilling rig increase, and therefore larger engine units are required. One of the chief difficulties in constructing a multiple engine power plant of larger capacity is that the length of the engine units themselves approach eight feet, and there is no additional space available for the power compounding drives connecting the engines. This invention provides a solution to this problem and enables the drive elements of each drive group to be telescoped into the required eight-foot width.

Another advantage realized with this construction is that the power take-off sprocket 38 may be driven at a standard basic speed regardless of the maximum speeds of the particular engine units 12 and 13 which may be employed. For example, a speed of 900 R. P. M. may be considered the optimum maximum speed for the power take-off sprocket 38, considering the various operations which the drawworks 11 is required to perform. It is not necessary, however, to select engine units having an optimum maximum speed of 900 R. P. M. since the sizes of the sprockets 14—24 and 15—26 may be proportioned so that the shafts 16 and 32 operate at 900 R. P. M. Standard commercially available engine units having maximum speeds as high as 1600 R. P. M. or higher may therefore be employed.

In operation the power of the engine units 12 and 13 may be combined to drive either the drawworks 11 or to drive the pump pulley 52, or the engine unit 12 may drive the pump pulley 52 while the engine unit 13 drives the drawworks 11. When it is desired to combine the power output from both engine units the spline clutch 42 is engaged to connect the sprocket 35 in driving relation with the power compounding shaft 16. The connection devices 23 and 31 may be employed for disconnecting the drive to the shafts 16 and 32 when desired so that the engines may continue to turn while the shafts are idle. If these connection devices 23 and 31 take the form of hydraulic couplings, the scoop tubes in such couplings may be utilized to remove fluid from the working circuits so that the couplings may function as clutches.

As shown in Figure 3, I may provide an enclosure for the hydraulic coupling 23. This is accomplished by employing a floor plate 60 which forms a cover for the enclosure 61. The other walls of the enclosure include side plates 62, end walls 63, and floor 64. This floor plate also provides a walkway between the engine units 12 and 13 and between the engine unit 13 and the drawworks 11.

Having fully described my invention, it is to be understood that I do not wish to be limited to the details herein set forth, but my invention is of the full scope of the appended claims.

I claim:

1. In a power plant for a well drilling rig, the combination of: a pair of engine units positioned in parallel side-by-side relation, each of the engine units having a power take-off member at one end thereof, the power take-off members being positioned in substantial alignment on the same corresponding ends of the engine units, first and second shafts extending parallel to said engine units, means for driving the first shaft from the power take-off member on one of the engine units, the second shaft being located between the engine units and positioned therebelow, means for driving the second shaft from the power take-off member on the other engine unit, and a power compounding drive connection including an endless flexible element extending between said shafts under the first said engine unit at a position remote from the power take-off member thereof.

2. In a power plant for a well drilling rig, the combination of: a pair of engine units positioned in parallel side-by-side relation, each of the engine units having a power take-off member at one end thereof, the power take-off members being positioned in substantial alignment on the same corresponding ends of the engine units, first and second shafts extending parallel to said engine units, means for driving the first shaft from the power take-off member on one of the engine units, the second shaft being located between the engine units and positioned therebelow, means including a releasable clutch for driving the second shaft from the power take-off member on the other engine unit, and a power compounding drive connection including an endless flexible element extending between said shafts under the first said engine unit at a position remote from the power take-off member thereof.

3. In a power plant for a well drilling rig, the combination of: a frame, a pair of engine units supported on the frame and extending transversely thereof, each of the engine units having a power take-off member, the power take-off members being positioned on the same side of the frame, first and second parallel shafts carried on the frame and extending transversely thereof, means for driving the first shaft from the power take-off member on one of the engine units, the second shaft being located between the engine units and positioned therebelow, means for driving the second shaft from the power take-off member on the other engine unit, and a power compounding drive connection including an endless flexible element extending longitudinally of the frame between said shafts under the first said engine unit at a position remote from the power take-off member thereof.

4. In a power plant for a well drilling rig, the combination of: a frame, a pair of engine units supported on the frame and extending transversely thereof, each of the engine units having a power take-off member, the power take-off members being positioned on the same side of the frame, first and second parallel shafts carried on the frame and extending transversely thereof, means for driving the first shaft from the power take-off member on one of the engine units, the second shaft being located between the engine units and positioned therebelow, means including a releasable clutch for driving the second shaft from the power take-off member on the other engine unit, and a power compounding drive connection including an endless flexible element extending longitudinally of the frame between said shafts under the first said engine unit at a position remote from the power take-off member thereof.

5. In a power plant for a well drilling rig, the combination of: a frame, a pair of engine units supported on the frame and extending transversely thereof, each of the engine units having a power take-off member, the power take-off members being positioned on the same side of the frame, first and second parallel shafts carried on the frame and extending transversely thereof, both of said shafts being located below the engine units and one of the shafts being positioned between the engine units, means for driving each of said shafts from one of said power take-off members, and a power compounding drive connection including an endless flexible element extending between said shafts longitudinally of the frame under the first said engine unit at a position remote from the power take-off member thereof.

6. In a power plant for a well drilling rig, the combination of: a frame, a pair of engine units supported on the frame and extending transversely thereof, each of the engine units having a power take-off member, the power take-off members being positioned on the same side of the frame, first and second parallel shafts carried on the frame and extending transversely thereof, both of said shafts being located below the engine units and one of the shafts being positioned between the engine units, means including a releasable clutch for driving each of said shafts from one of said power take-off members, and a power compounding drive connection including an endless flexible element extending between said shafts longitudinally of the frame under the first said engine unit at a position remote from the power take-off member thereof.

7. In a power plant for a well drilling rig, the combination of: a longitudinally extending frame, a pair of parallel engine units supported on the frame and extending transversely for substantially the full width thereof, each of the engine units including a power take-off member at one end thereof, the power take-off members being positioned on the same side of the frame, first and second parallel shafts carried on the frame and extending transversely thereof, both of the shafts being located below the engine units and one of the shafts being positioned between the engine units, means for driving each of the shafts from one of the power take-off members, and a power compounding drive connection including an endless flexible element extending between said shafts under the first said engine unit adjacent the side of the frame remote from the power take-off members.

8. In a power plant for a well drilling rig, the combination of: a pair of engine units positioned in parallel side-by-side relation, each of the engine units having a power take-off member at one end thereof, the power take-off members being positioned in substantial alignment on the same corresponding ends of the engine units, first and second shafts extending parallel to said engine units, means for driving the first shaft from the power take-off member on one of the engine units, the second shaft being located between the engine units and positioned therebelow, a stub shaft positioned in coaxial alignment with said second shaft, means including an endless flexible element for driving the stubshaft from the power take-off member on the other of the engine units, a releasable coupling device connecting adjacent ends of said shaft and stubshaft, and a power compounding drive connection including an endless flexible element extending between said shafts under the first said engine unit at a position remote from the power take-off member thereof.

9. In a power plant for a well drilling rig, the combination of: a frame, a pair of engine units supported on the frame and extending transversely thereof, each of the engine units having a power take-off member, the power take-off members being positioned on the same side of the frame, first and second parallel shafts carried on the frame and extending transversely thereof, means for driving the first shaft from the power take-off member on one of the engine units, the second shaft being located between the engine units and positioned therebelow, a stubshaft carried on the frame in coaxial alignment with said second shaft, means including an endless flexible element for driving the stubshaft from the power take-off member on the other of the engine units, a releasable coupling device connecting adjacent ends of said shaft and stubshaft, and a power compounding drive connection including an endless flexible element extending longitudinally of the frame between said shafts under the first said engine unit at a position remote from the power take-off member thereof.

10. In a power plant for a well drilling rig, the combination of: a longitudinally extending frame, a pair of parallel engine units supported on the frame and extending transversely for substantially the full width thereof, each of the engine units including a power take-off member at one end thereof, the power take-off members being positioned on the same side of the frame, first and second parallel shafts carried on the frame and extending transversely thereof, stubshafts carried on the frame in coaxial alignment with each of said shafts, means including an endless flexible element for driving each stubshaft from one of the power take-off members, a releasable coupling device connecting adjacent ends of each shaft and stubshaft, and a power compounding drive connection including an endless flexible element extending between said shafts under the first said engine unit adjacent the side of the frame remote from the power take-off members.

11. In a power plant for a well drilling rig, the combination of a frame, a pair of engine units supported on the frame and extending transversely thereof, each of the engine units having a power take-off member, the power take-off members being positioned on the same side of the frame, first and second parallel shafts carried on the frame and extending transversely thereof, means for driving the first shaft from the power take-off member on one of the engine units, the second shaft being located between the engine units and positioned therebelow, a rotary element carried on the frame in coaxial alignment with said second shaft, means including an endless flexible element for driving the rotary element from the power take-off member on the other of the engine units, a hydraulic coupling operatively interposed between the rotary element and said shaft, and a power compounding drive connection including an endless flexible element extending between said shafts under the first said engine unit at a position remote from the power take-off member thereof.

12. In a power plant for a well drilling rig, the combination of: a frame, a plurality of engine units supported on the frame and extending transversely thereof, a shaft, means for driving the shaft from a first of said engine units, a shaft positioned between said first engine unit and a second engine unit below the level thereof and extending parallel thereto, means for driving the latter said shaft including a power take-off member at one end of the second engine unit adjacent one side of the frame, power transmission connections for connecting the shafts in direct driving relation including an endless flexible element extending longitudinally of the frame between the shafts and passing under the first said engine unit adjacent the side of the frame remote from the said power take-off member.

13. In a power plant for a well drilling rig, the combination of: a frame, first and second parallel shafts extending transversely of the frame and spaced longitudinally of the frame, a first engine unit positioned between the first and second shafts, a second engine unit positioned adjacent the second shaft, the engine units each extending transversely of the frame and being positioned above the level of the shafts, the engine units each having a power take-off member, the power take-off members being positioned on the same side of the frame, transmission connections including an endless flexible element whereby the power take-off member of the first engine unit may drive the first shaft, transmission connections including an endless flexible element whereby the power take-off member on the second engine unit may drive the second shaft, and a power compounding drive connection including an endless flexible element extending under the first engine unit longitudinally of the frame at a position remote from the power take-off member thereof for connecting the first and second shafts for dependent rotation.

14. In a power plant for a well drilling rig, the combination of: a frame, first and second parallel shafts extending transversely of the frame and spaced longitudinally of the frame, a first engine unit positioned between the first and second shafts, a second engine unit positioned adjacent the second shaft, the engine units each extending transversely of the frame and being positioned above the level of the shafts, the engine units each having a power take-off member, the power take-off members being positioned on the same side of the frame, transmission connections including a releasable clutch element whereby the power take-off member of the first engine unit may drive the first shaft, transmission connections including a releasable clutch element whereby the power take-off member on the second engine unit may drive the second shaft, and a power compounding drive connection including an endless flexible element extending under the first engine unit longitudinally of the frame at a position remote from the power take-off member thereof for connecting the first and second shafts for dependent rotation.

15. In a power plant for a well drilling rig, the combination of a frame, first, second and third parallel shafts extending transversely of the frame and spaced longitudinally of the frame, a first engine unit positioned between the first and second shafts, a second engine unit positioned between the second and third shafts, the engine units each extending transversely of the frame for substantially the full width thereof and being positioned above the level of the shafts, the engines each having a power take-off member, the power take-off members being positioned on the same side of the frame, transmission connections whereby the power take-off member of the first engine unit may drive the first shaft, transmission connections whereby the power take-off member on the second engine unit may drive the second shaft, a power compounding drive connection including an endless flexible element extending under the first engine unit at a position remote from the power take-off member thereof for connecting the first and second shafts for dependent rotation, power transmission connections for driving the third shaft from the second shaft including an endless flexible element extending under the second engine unit at a location remote from the power take-off member thereof, and means whereby the first and third shafts may each drive a driven mechanism.

JOHN D. SPALDING.

References Cited in the file of this patent
UNITED STATES PATENTS

| Number | Name | Date |
|---|---|---|
| 1,825,087 | Park | Sept. 29, 1931 |
| 2,071,778 | Walne | Feb. 23, 1937 |
| 2,360,753 | Anderson | Oct. 17, 1944 |
| 2,488,069 | Spalding | Nov. 15, 1949 |
| 2,539,584 | Maier | Jan. 30, 1951 |
| 2,541,625 | Webster | Feb. 13, 1951 |